United States Patent
Chong et al.

(10) Patent No.: US 7,203,136 B2
(45) Date of Patent: Apr. 10, 2007

(54) OPTICAL PICKUP ACTUATOR CAPABLE OF PERFORMING FOCUSING, TRACKING AND TILTING OPERATIONS

(75) Inventors: Duk-young Chong, Seoul (KR); Kyung-sik Shin, Gyeonggi-do (KR); Hyung-joo Kang, Seoul (KR); Young-bin Lee, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 589 days.

(21) Appl. No.: 10/350,088

(22) Filed: Jan. 24, 2003

(65) Prior Publication Data

US 2003/0161227 A1 Aug. 28, 2003

(30) Foreign Application Priority Data

Feb. 26, 2002 (KR) ............... 2002-10264

(51) Int. Cl.
*G11B 7/135* (2006.01)
(52) U.S. Cl. .................. 369/44.15; 359/814; 720/683
(58) Field of Classification Search ............. None
See application file for complete search history.

(56) References Cited

U.S. PATENT DOCUMENTS

| | | | |
|---|---|---|---|
| 5,165,088 A * | 11/1992 | Suzuki et al. ............ 369/44.14 |
| 5,684,645 A | 11/1997 | Tomiyama et al. | |
| 6,344,936 B1 * | 2/2002 | Santo et al. ............... 359/824 |
| 6,345,031 B1 * | 2/2002 | Ryoo et al. ................. 720/684 |
| 6,570,720 B2 * | 5/2003 | Kawano .................... 359/813 |
| 6,741,543 B1 * | 5/2004 | Suzuki et al. .............. 720/683 |
| 2001/0028515 A1 | 10/2001 | Kawano | |
| 2002/0006090 A1 * | 1/2002 | Kawano .................. 369/44.32 |
| 2003/0012090 A1 * | 1/2003 | Kawano .................. 369/44.16 |

FOREIGN PATENT DOCUMENTS

| | | |
|---|---|---|
| CN | 1157718 C | 7/2004 |
| JP | 06-243492 | 2/1994 |
| JP | 7-141670 | 6/1995 |
| JP | 08-203104 | 8/1996 |
| JP | 2000-2774 | 2/2000 |
| JP | 2000-207757 | 7/2000 |
| JP | 2001-64312 | 3/2001 |
| JP | 2001-167458 | 6/2001 |
| JP | 2001-273653 | 10/2001 |

* cited by examiner

*Primary Examiner*—Andrea Wellington
*Assistant Examiner*—Michael V. Battaglia
(74) *Attorney, Agent, or Firm*—Staas & Halsey LLP

(57) ABSTRACT

An optical pickup actuator and an optical recording and/or reproducing apparatus using the same. The optical pickup actuator includes a base having a holder positioned at one side of the base, a blade having an objective lens mounted at one side of the blade and a guide groove, a magnetic driving portion which includes at least one fine pattern coil installed across the guide groove, magnets arranged to be embedded in the guide groove opposite to each other at both sides of the FPC, and elastic supporting members having one end coupled to the holder such that the blade is movably supported.

39 Claims, 7 Drawing Sheets

OPTICAL PICKUP ACTUATOR CAPABLE OF PERFORMING FOCUSING, TRACKING AND TILTING OPERATIONS

CROSS-REFERENCE TO RELATED APPLICATIONS

This application claims the benefit of Korean Application No. 2002-10264, filed Feb. 26, 2002, in the Korean Industry Property Office, the disclosure of which is incorporated herein by reference.

BACKGROUND OF THE INVENTION

1. Field of the Invention

The present invention relates to an optical pickup actuator having a slim and lightweight structure which performs a tilting operation in a limited space while a driving force thereof is maximized, and an optical recording and/or reproducing apparatus using the same.

2. Description of the Related Art

In general, optical pickups are embedded in an optical recording and/or reproducing apparatus, move in a radial direction of a disc used as a recording medium, and record and/or reproduce information on/from the disc in a non-contact manner. Such optical pickups include an actuator which drives an objective lens in tracking and focusing directions of the disc such that an optical spot is irradiated in a desired track position of the disc. Portable personal computers (PCs) such as notebooks, should be thin and lightweight, resulting in spatial limitations in the entire system. Thus, an actuator embedded in such PCs should also be slim. A reflection mirror is embedded in the optical pickups so that light faces an objective lens. In order to meet the needs of a slim actuator, an asymmetrical actuator in which the driving axis of the actuator and the optical axis of the objective lens are differently placed, has been proposed such that a distance between the objective lens and the reflection mirror of the optical pickups is reduced. An example thereof is disclosed in U.S. Pat. No. 5,684,645.

Figure 1:
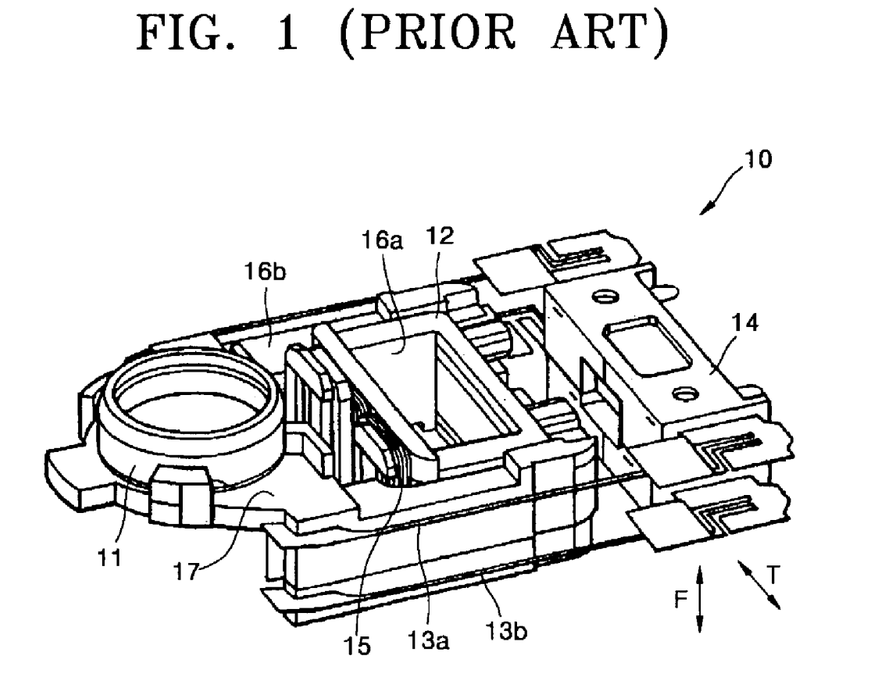
FIG. 1 is a perspective view of a conventional optical pickup actuator.
Figure 2:
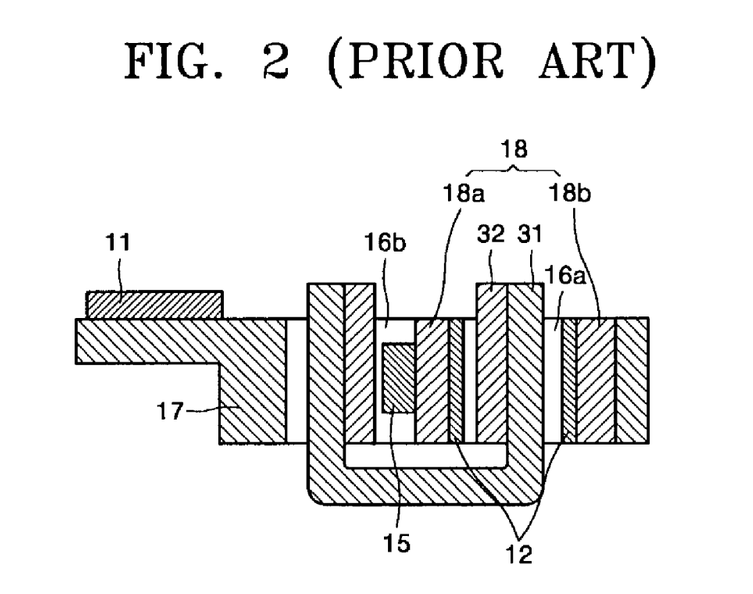
FIG. 2 is a cross-sectional view of a conventional optical pickup actuator.

Referring to FIGS. 1 and 2, a conventional optical pickup actuator 10 includes a holder 14 placed at one side of the optical pickup actuator 10, a focusing coil 18 wound along the circumference of a bobbin 12 having a first guide groove 16a in the center of the bobbin 12, and a pair of tracking coils 15 placed at one side of the bobbin 12. The optical pickup actuator 10 further includes a second guide groove 16b formed in a moving portion 17 having an objective lens 11 mounted at one side of the moving portion 17, and the bobbin 12 is embedded in the second guide groove 16b. Here, a U-shaped yoke 31 is embedded through the first guide groove 16a and the second guide groove 16b, and a magnet 32 is mounted at an internal side of the U-shaped yoke 31 such that the pair of tracking coils 15 are opposite to the focusing coil 18.

The focusing coil 18 may be divided into a portion 18a wound at the inside of the U-shaped yoke 31, and a portion 18b wound at the outside of the U-shaped yoke 31. An effective coil portion to which a force generated by the magnet 32 can be applied is only a focusing coil 18a wound at the inside of the U-shaped yoke 31, and a focusing coil 18b wound at the outside of the U-shaped yoke 31 does not contribute to driving in a focusing direction. Thus, compared to the length of the focusing coil 18, power consumption is large, a driving force is small, and the volume of the conventional actuator is big.

The moving portion 17 is movably supported by a pair of wires 13a and 13b having one end fixed on the holder 14 and the other end fixed at both sides of the moving portion 17. The moving portion 17 and the bobbin 12 are movably coupled to each other. If current is applied to the focusing coil 18 and the tracking coils 15, a force is applied to the tracking coils 15 and the focusing coil 18 by electromagnetic interaction of the magnet 32, the focusing coil 18, and the tracking coils 15, and thereby the moving portion 17 works together with the bobbin 12. The direction in which a force is applied to the focusing coil 18 and the tracking coils 15 follows Flemings' left hand rule.

If an electromagnetic force is applied to the focusing coil 18 and the tracking coils 15 by interaction of the focusing coil 18, the tracking coil 15, and the magnet 32, the moving portion 17 moves in a focusing direction F or tracking direction T. As a result, the objective lens 11 mounted on the moving portion 17 moves, and thus a position in which an optical spot is formed on a disc (not shown) is adjusted.

In the above structure, the objective lens 11 is arranged at the circumference of the actuator 10 while the reflection mirror may be placed under the objective lens 11, thereby obtaining a slim optical pickup. Further, in order to meet the needs of a slim and lightweight optical pickup, a fine pattern coil (FPC) instead of a winding coil may be used as a focusing coil and a tracking coil. In order to increase a driving force in asymmetrical actuators and obtain slim asymmetrical actuators, the structure of a magnetic circuit having an FPC and a magnet needs to be studied. As optical pickups become slim, it is not easy to couple the pair of wires 13a and 13b to the moving portion 17. To drive in the focusing direction, tracking direction, and tilting direction, a conventional actuator has six wires. Further, four-axis drive actuators which drive in the focusing direction, tracking direction, radial tilting direction, and track tilting direction require more wires. In this case, there are spatial limitations when a plurality of wires are installed in a very narrow space. As the number of wires is increased, it is very difficult to perform a process of attaching the wires, and thus a defective rate during the manufacturing of drive actuators is increased.

SUMMARY OF THE INVENTION

Accordingly, it is an aspect of the present invention to provide an optical pickup actuator having a slim structure in which a magnetic circuit is formed by including a fine pattern coil (FPC) and a magnetized polarization magnet such that focusing, tracking, and tilting operations are performed, while a driving force thereof is enhanced, and an optical recording and/or reproducing apparatus using the same.

Additional aspects and advantages of the present invention will be set forth in part in the description which follows and, in part, will be obvious from the description, or may be learned by practice of the invention.

The foregoing and/or other aspects of the present invention may be achieved by providing an optical pickup actuator comprising: a base having a holder positioned at one side of the base; a blade having an objective lens mounted at one side of the blade and a guide groove; a magnetic driving portion which includes at least one fine pattern coil installed across the guide groove and magnets arranged to be positioned in the guide groove opposite to each other at both sides of the fine pattern coil; and elastic supporting members having one end coupled to the holder such that the blade is movably supported.

In an aspect of the present invention, at least one fine pattern coil comprises first and second fine pattern coils which are overlapped.

The first and second fine pattern coils are centered on a center line, focusing coils are respectively arranged at one side of the first and second fine pattern coils, and tracking coils are respectively arranged at the other end of the first and second fine pattern coils.

The focusing coils respectively arranged in each of the first and second fine pattern coils are arranged symmetrically.

Current is respectively supplied to the focusing coil of the first fine pattern coil and the focusing coil of the second fine pattern coil such that a tilting operation is performed.

The tracking coils arranged in each of the first and second fine pattern coils are arranged symmetrically.

The magnets are polarization magnets.

The elastic supporting members are coupled to both ends of the first and second fine pattern coils.

The elastic supporting members are alternately soldered at each side of the first and second fine pattern coils.

The foregoing and/or other aspects of the present invention may also be achieved by providing an optical pickup actuator comprising: a base having a holder positioned at one side of the base; a blade having an objective lens mounted at one side of the blade and a guide groove; a magnetic driving portion which includes a first fine pattern coil having tracking coils arranged at one side of the first fine pattern coil and a focusing coil arranged at the other end of the first fine pattern coil, a second fine pattern coil having tracking coils and a focusing coil that are arranged symmetrically with the tracking coils and the focusing coil of the first fine pattern coil, respectively and magnets arranged to be positioned in the guide groove opposite to each other at both sides of the first and second fine pattern coils; and elastic supporting members having one end coupled to the holder and the other end coupled to both ends of the first and second fine pattern coils.

In an aspect of the present invention, the magnets are two-pole magnetized polarization magnets, the poles of which are disposed upward and downward.

Holes which serve as paths through which current is supplied to the first and second fine pattern coils are further formed in the first and second fine pattern coils.

The foregoing and/or other aspects of the present invention may also be achieved by providing an optical recording and/or reproducing apparatus including a spindle motor which rotates a disc, an optical pickup which is installed to be movable in the direction of a radius of the disc and includes an actuator which reproduces or records information recorded on the disc, a driving portion which drives the spindle motor and the optical pickup, and a portion which controls focusing, tracking, and tilting servos of the optical pickup, wherein the optical pickup actuator comprises: a base having a holder positioned at one side of the base; a blade having an objective lens mounted at one side of the blade and a guide groove; a magnetic driving portion which includes at least one fine pattern coil installed across the guide groove and magnets arranged to be embedded in the guide groove opposite to each other at both sides of the fine pattern coil; and elastic supporting members having one end coupled to the holder such that the blade is movably supported.

BRIEF DESCRIPTION OF THE DRAWINGS

These and/or other aspects and advantages of the invention will become apparent and more readily appreciated from the following description of the preferred embodiments, taken in conjunction with the accompanying drawings of which.

DETAILED DESCRIPTION OF THE INVENTION

Figure 3:
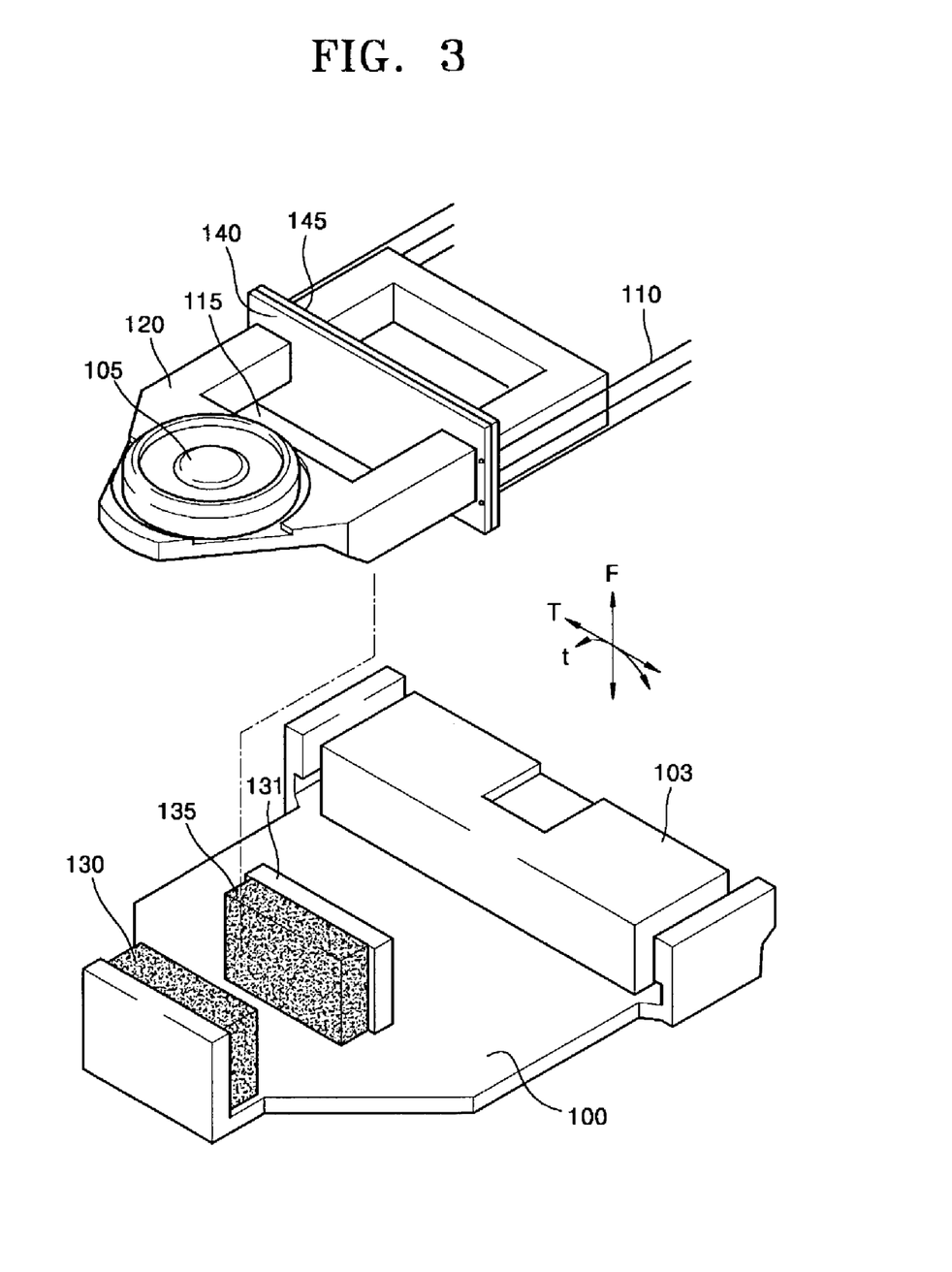
FIG. 3 is an exploded perspective view of an optical pickup actuator according to an embodiment of the present invention.
Figure 4:
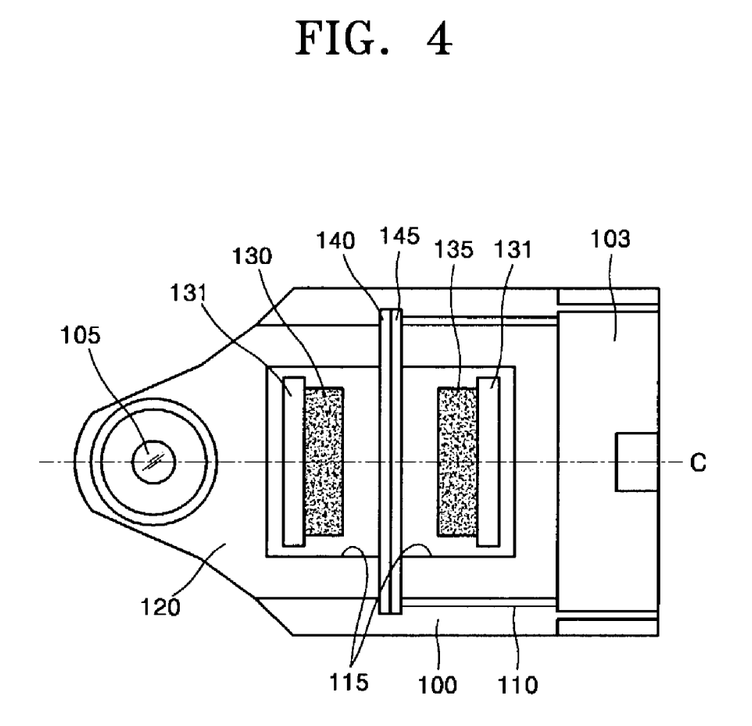
FIG. 4 is a plan view of the optical pickup actuator according to FIG. 3.

Referring to FIGS. 3 and 4, an optical pickup actuator according to an embodiment of the present invention includes a base 100, a holder 103 positioned at one side of the base 100, a blade 120 on which an objective lens 105 is mounted, having a guide groove 115 in the center of the blade 120, and a magnetic driving portion (described in more detail below) which drives the blade 120 in a focusing, tracking, or tilting direction.

Figure 5:
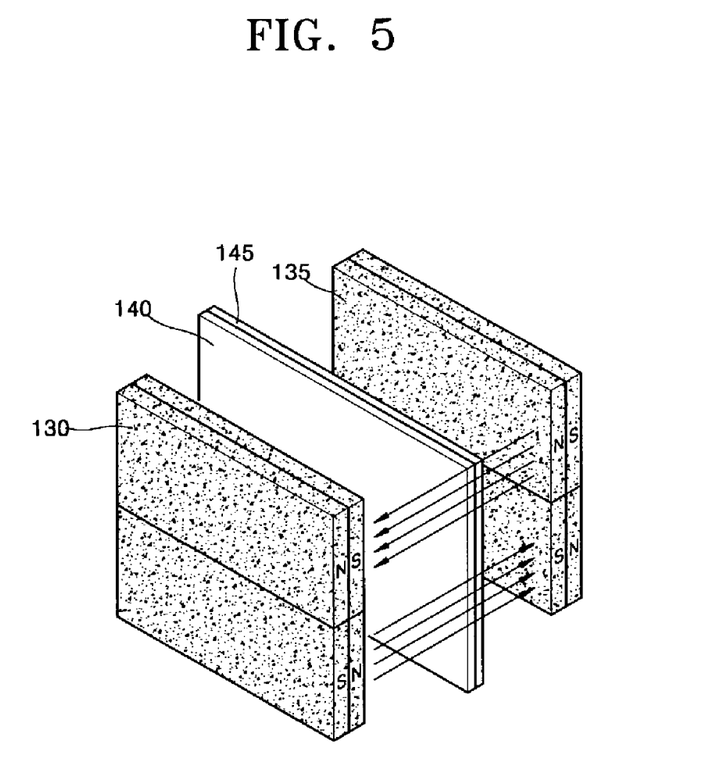
FIG. 5 schematically illustrates a magnetic driving portion of the optical pickup actuator according to FIGS. 3 and 4.

As shown in FIG. 5, the magnetic driving portion includes at least one fine pattern coil (FPC), and first and second magnets 130 and 135 that are opposite to each other at both sides of the FPC. Here, the at least one FPC includes two pieces, first and second FPCs 140 and 145, which can be overlapped and arranged between the first and second magnets 130 and 135, respectively. The first and second FPCs 140 and 145 are installed in the blade 120 across the guide groove 115. In FIG. 5, arrows denote magnetic force lines.

The magnetic driving portion further includes a plurality of elastic supporting members 110 having one end fixed at both ends of the first and second FPCs 140 and 145 and the other end coupled to the holder 103. As a result, the blade 120 is movably supported by the elastic supporting members 110. The elastic supporting members 110 support the blade 120 and serve as a path through which current is supplied to the first and second FPCs 140 and 145.

The guide groove 115 is divided into two grooves at the first and second FPCs 140 and 145. The first and second magnets 130 and 135 are positioned in the two guide grooves 115, respectively. A yoke 131 which fixes the first and second magnets 130 and 135 and forms a magnetic path may be further included. The first and second magnets 130 and 135 may be magnetized polarization magnets, for example, two-pole magnetized polarization magnets, the poles being disposed upward and downward. Preferably, the opposite poles of the first and second magnets 130 and 135 are placed at each opposite side such that magnetic force lines vertically pass through sides of the first and second FPCs 140 and 145. In this way, a magnetic flux passing through the first and second FPCs 140 and 145 can be maximized, and thus a driving force thereof can be maximized.

If current is supplied to the first and second FPCs 140 and 145, a Lorenz's force is applied to the first and second FPCs 140 and 145 by interaction of the first and second magnets 130 and 135. As a result, the blade 120 moves. The interaction between the first and second FPCs 140 and 145 and the first and second magnets 130 and 135 will be described in greater detail below.

Figure 6:
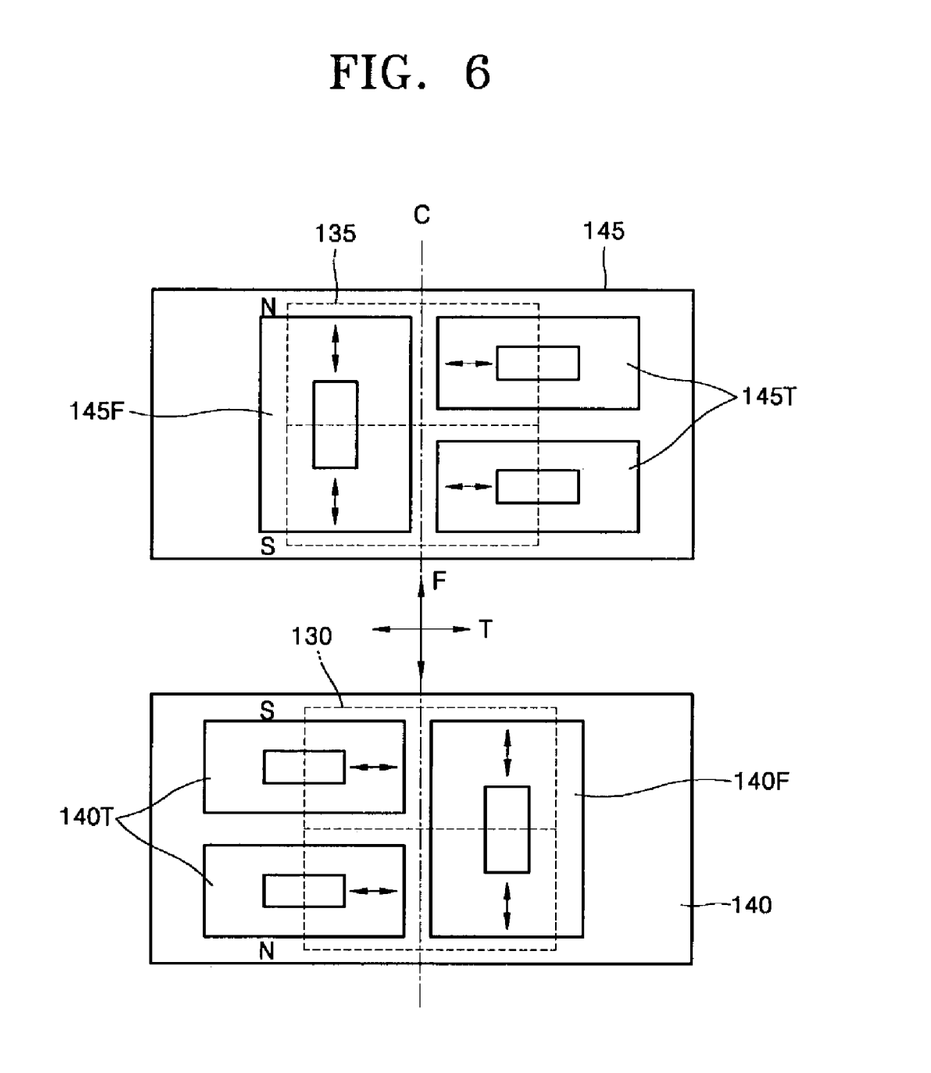
FIG. 6 illustrates operation of the optical pickup actuator according to FIGS. 3 and 4.

FIG. 6 illustrates a magnetic circuit to perform a focusing operation and a tracking operation of the blade 120. A first focusing coil 140F and first tracking coils 140T are patterned in the first FPC 140. Poles of the first magnet 130 are disposed upward and downward. Centering on a center line C, the first focusing coil 140F is arranged at one side of the first FPC 140, and the first tracking coils 140T are arranged at the other side of the first FPC 140. The first focusing coil 140F is arranged across a polarization boundary of the first magnet 130, and the first tracking coils 140T are arranged to face each other with respect to a N-pole and a S-pole of the first magnet 130. In this case, a coil placed at an external side of the first tracking coils 140T centering on the center line C of the first FPC 140 should be placed in a portion where it is not affected by the magnetic force line generated in the first magnet 130. This is because tracking driving is implemented by a coil placed at the internal side of the first tracking coils 140T. A coil placed at an external side of the first focusing coils 140F does not contribute to the focusing operation and thus may be arranged not to be opposite to the first magnet 130.

The arrangement relationship of the second magnet 135 and the second FPC 145 and the electromagnetic interaction of the second magnet 135 and the second FPC 145 will be described below. Opposite poles corresponding to the first magnet 130 should be placed in the second magnet 135. Centering on the center line C, a second focusing coil 145F is arranged at one side of the second FPC 145, and second tracking coils 145T are arranged at the other side of the second FPC 145. When the first and second FPCs 140 and 145 are overlapped, the second focusing coil 145F and the second tracking coils 145T are arranged symmetrical with respect to the first focusing coil 140F and the first tracking coils 140T.

An operation in a focusing direction F and an operation in a tracking direction T of the blade 120 are performed by the magnetic circuit of the first and second FPCs 140 and 145. First, the magnetic path is formed by the first and second magnets 130 and 135. If current flows through the first focusing coil 140F and the second focusing coil 145F, the first and second FPCs 140 and 145 rise and fall. In this case, the first and second focusing coils 140F and 145F are arranged symmetrically at both sides of the center line C such that the blade 120 is stably driven during a focusing operation.

If current flows through the first and second tracking coils 140T and 145T, the first and second FPCs 140 and 145 move to the right and left, respectively. In this case, the first and second tracking coils 140T and 145T are arranged symmetrically at both sides of the center line C such that the blade 120 is stably driven during a tracking operation.

A vertical direction in which the blade 120 moves upward and downward for the focusing operation may be controlled by adjusting the direction of the current flowing through the first and second focusing coils 140T and 145F. A horizontal direction in which the blade 120 moves to the right and left for the tracking operation may be controlled by adjusting the direction of the current flowing through the first and second tracking coils 140T and 145T.

According to the present invention, even though in each of the first and second FPCs 140 and 145 the first and second focusing coils 140F and 145F and the first and second tracking coils 140T and 145T are arranged symmetrically at both sides of the center line C, two pieces of the first and second FPCs 140 and 145 are overlapped such that an entire symmetrical structure is formed. Current flows through first and second focusing coils 140F and 145F in an identical direction such that a stable focusing operation is performed. Also, current flows through the first and second tracking coils 140T and 145T in an identical direction such that a stable tracking operation is also performed.

Figure 7:
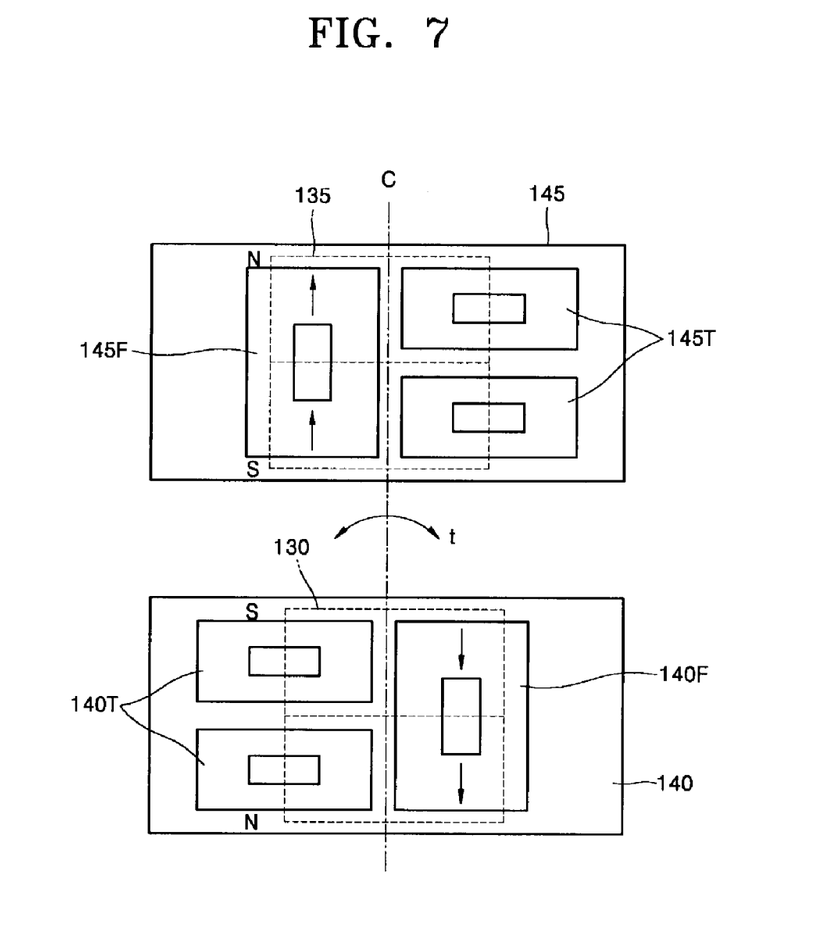
FIG. 7 illustrates a tilting operation of the optical pickup actuator according to FIGS. 3 and 4.

A tilting operation will be described with reference to FIG. 7. If current flows through the first and second focusing coils 140F and 145F in an opposite direction, the first and second FPCs 140 and 145 move upward and downward, respectively, in an opposite direction. Here, the first and second FPCs 140 and 145 move asymmetrically centering on the center line C such that an operation in a tilting direction t is performed.

As described above, according to the present invention, the actuator can be slim, and the tilting operation with the focusing and tracking operations can be simultaneously performed using the FPCs. For the tilting operation, a circuit should be constituted so that current is applied to the first and second focusing coils 140F and 145F, respectively. Thus, for the focusing, tracking, and tilting operations, six elastic supporting members 110 are required. One end of one of the elastic supporting members 110 is coupled to the holder 103 and the other end is coupled to the first and second FPCs 140 and 145 such that the blade 12 is movably supported. It is well-known that soldering is performed so as to couple the six elastic supporting members 110. Considering the size of the actuator, it is not easy to make space where only three of the elastic supporting members 110 can be soldered at one side of the actuator.

Figure 8:
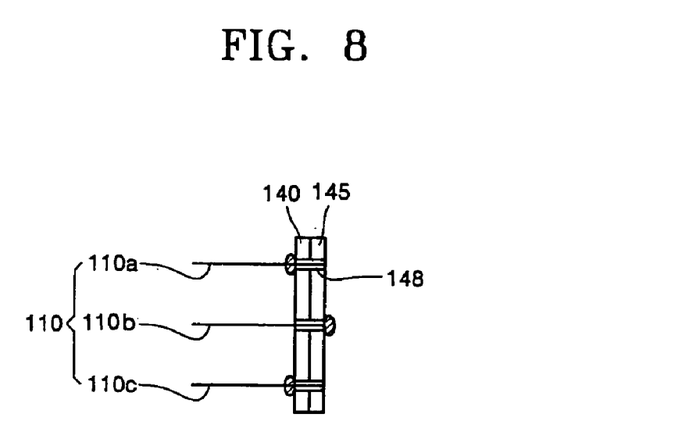
FIG. 8 is an enlarged view of a portion of an optical pickup actuator according to FIGS. 3 and 4 in which wires are coupled to each other.

According to the present invention, the elastic supporting members 110 are soldered at both ends of the first and second FPCs 140 and 145. In this case, as shown in FIG. 8, the elastic supporting members 110 are alternately soldered at each side of the first and second FPCs 140 and 145 such that the elastic supporting members 110 are effectively soldered in a narrow space. More specifically, when only three elastic supporting members 110 are soldered upward and downward, upper 100a and lower 100c elastic supporting members are soldered at the side of the first FPC 140, and the middle elastic supporting member 110b is soldered at the side of the second FPC 145. Further, holes 148, which serve as paths through which current are supplied to the first and second FPCs 140 and 145, are formed in the first and second FPCs 140 and 145. Thus, the elastic supporting members 110 are easily soldered through the holes 148. Since current flows through the elastic supporting members 110 through the holes 148, an additional wire or PCB is not required for electrical connection, and thus the productivity of the actuator is increased.

Figure 9:
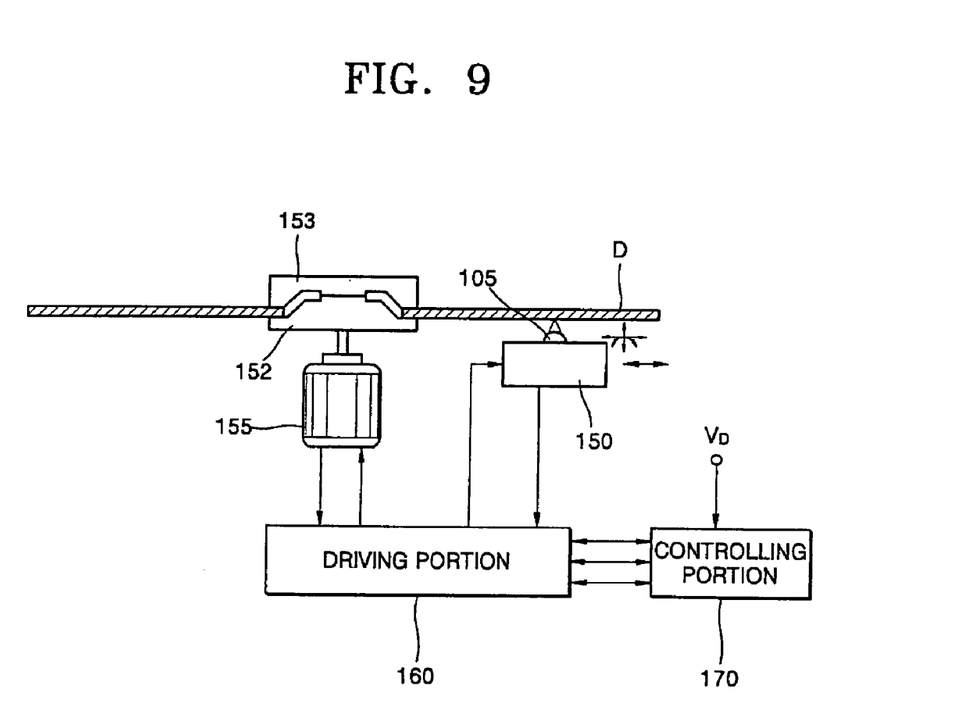
FIG. 9 schematically illustrates an optical recording and/or reproducing apparatus in which the optical pickup actuator according to FIGS. 3 and 4 is embedded.

Referring to FIG. 9, the optical recording and/or reproducing apparatus in which the optical pickup actuator according to the present invention is embedded includes a spindle motor 155 which rotates a disc D, an optical pickup 150 which is installed in the direction of a radius of the disc D and includes an actuator which reproduces or records information recorded on the disc D, a driving portion 160 which drives the spindle motor 155 and the optical pickup 150, and a controlling portion 170 which controls focusing, tracking, and tilting servos of the optical pickup 150. Here, reference numerals 152 and 153 denote a turntable and a clamp to chuck the disc D, respectively. The optical pickup 150 includes an optical system having an objective lens 105 which focuses light emitted from a light source (not shown) on the disc D, and an actuator which drives the objective lens 105 in focusing, tracking, and tilting directions.

Light reflected from the disc D is detected by the optical pickup 150, is photoelectrically converted into an electrical signal, and the electrical signal is input into the controlling portion 220 through the driving portion 210. The driving portion 160 controls rotation speed of the spindle motor 155, amplifies an inputted signal and drives the optical pickup 150. The controlling portion 170 transmits commands for a focusing servo, a tracking servo, and a tilting servo that are controlled based on the signal inputted from the driving portion 160, into the driving portion 160 so as to perform the focusing, tracking, and tilting operations of the optical pickup 150.

Likewise, the actuator having a slim structure according to the present invention is embedded in the optical recording and/or reproducing apparatus, thereby reducing the volume of the entire apparatus.

In the optical pickup actuator according to the present invention, two pieces of the FPCs are first overlapped and then arranged in the actuator structure, and then, the objective lens is arranged at one side of the blade such that a slim and lightweight structure is formed. The density of the magnetic flux is increased using the magnetic force generated in the magnetized polarization magnets placed at both sides of the FPCs such that the driving force during the focusing, tracking, and tilting operations is increased. The focusing coil is patterned at one side of the FPC such that the length of the effective coil is increased, a driving force with respect to an identical voltage is increased and power consumption is reduced.

Since the FPCs overlap, the elastic supporting member or PCB which connects the FPCs to each other is not required such that it is easy to manufacture the FPCs and it is easier to balance a force, compared to the case when the FPCs are separately arranged, and thus the FPCs are stably driven. Since current flows through the both sides of the FPCs through the holes formed when the FPCs are manufactured, the elastic supporting members are alternately soldered at both sides of the FPCs such that a plurality of elastic supporting members are effectively coupled to one another in a narrow space.

Further, the optical pickup actuator according to the present invention is embedded in the optical recording/reproducing apparatus such that recording and/or reproducing performances with respect to the disc used are improved.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. An optical pickup actuator comprising:
   a base having a holder positioned at one side of the base;
   a blade having an objective lens mounted at one side of the blade;
   a guide groove;
   a magnetic driving portion including at least one fine pattern coil installed across the guide groove and magnets embedded in the guide groove opposite to each other at both sides of the fine pattern coil;
   elastic supporting members having one end coupled to the holder such that the blade is movably supported;
   wherein the fine pattern coil comprises at least one focusing coil and at least one tracking coil, and
   wherein the fine pattern coil is centered on a center line, and the at least one focusing coil is arranged opposite the at least one tracking coil about the center line, the at least one focusing coil being situated entirely on one side of the center line and the at least one tracking coil being situated entirely on the other side of the center line.

2. The actuator of claim 1, wherein said at least one fine pattern coil comprises first and second fine pattern coils which are overlapped.

3. The actuator of claim 2, further comprising a plurality of the focusing coils respectively arranged symmetrically at each of the first and second fine pattern coils.

4. The actuator of claim 3, wherein current is respectively supplied to the focusing coil of the first fine pattern coil and the focusing coil of the second fine pattern coil such that a tilting operation is performed.

5. The actuator of claim 4, wherein the tracking coils arranged at each of the first and second fine pattern coils are arranged symmetrically.

6. The actuator of claim 5, wherein the magnets are polarization magnets.

7. The actuator of claim 6, wherein the elastic supporting members are coupled to both ends of the first and second fine pattern coils.

8. The actuator of claim 3, wherein the tracking coils arranged at each of the first and second fine pattern coils are arranged symmetrically.

9. The actuator of claim 8, wherein the magnets are polarization magnets.

10. The actuator of claim 9, wherein the elastic supporting members are coupled to both ends of the first and second fine pattern coils.

11. The actuator of claim 10, wherein the elastic supporting members are alternately soldered at each side of the first and second fine pattern coils.

12. The actuator of claim 2, wherein the magnets are magnetized polarization magnets.

13. The actuator of claim 1, wherein the magnets are polarization magnets.

14. An optical pickup actuator comprising:
   a base having a holder positioned at one side of the base;
   a blade having an objective lens mounted at one side of the blade; and
   a guide groove;
   a magnetic driving portion including at least one fine pattern coil installed across the guide groove and magnets embedded in the guide groove opposite to each other at both sides of the fine pattern coil; and
   elastic supporting members having one end coupled to the holder such that the blade is movably supported;
   wherein the fine pattern coil comprises first and second fine pattern coils which are overlapped, and
   wherein the elastic supporting members are alternately soldered in vertical relation along each side of the first and second fine pattern coils.

15. An optical pickup actuator comprising:

a base having a holder positioned at one side of the base;

a blade having an objective lens mounted at one side of the blade, and a guide groove;

a magnetic driving portion including a first fine pattern coil having tracking coils arranged at one side of the first fine pattern coil and a focusing coil arranged at the other side of the first fine pattern coil, a second fine pattern coil having tracking coils and a focusing coil that are arranged symmetrically with the tracking coils and the focusing coil of the first fine pattern coil, respectively, and magnets embedded in the guide groove opposite to each other at both sides of the first and second fine pattern coils; and elastic supporting members having one end coupled to the holder and the other end coupled to the first and second fine pattern coils;

wherein each of the fine pattern coils comprises at least one focusing coil and at least one tracking coil, and wherein each of the fine pattern coils is centered on a center line, and at least one of the focusing coils of each of the fine pattern coils is arranged opposite at least one of the tracking coils of the same fine pattern coil about the center line, the at least one focusing coil being situated entirely on one side of the center line and the at least one tracking coil being situated entirely on the other side of the center line.

16. The actuator of claim 15, wherein the first and second fine pattern coils are first overlapped and then installed in the actuator.

17. The actuator of claim 16, wherein current is supplied to the focusing coil of the first fine pattern coil and the focusing coil of the second fine pattern coil, respectively, such that a tilting operation is performed.

18. The actuator of claim 17, wherein the magnets are two-pole magnetized polarization magnets, the poles of which are disposed upward and downward.

19. The actuator of claim 18, further comprising holes serving as paths through which the current is supplied to the first and second fine pattern coils formed in the first and second fine pattern coils.

20. The actuator of claim 16, wherein the magnets are two-pole magnetized polarization magnets, the poles of which are disposed upward and downward.

21. The actuator of claim 20, wherein holes which serve as paths through which current is supplied to the first and second fine pattern coils are further formed in the first and second fine pattern coils.

22. The actuator of claim 21, wherein the elastic supporting members are alternately soldered at each side of the first and second fine pattern coils through the holes.

23. The actuator of claim 15, wherein the magnets are two-pole magnetized polarization magnets, the poles thereof are disposed upward and downward.

24. An optical pickup actuator comprising:

a base having a holder positioned at one side of the base;

a blade having an objective lens mounted at one side of the blade, and a guide groove;

a magnetic driving portion including a first fine pattern coil having tracking coils arranged at one side of the first fine pattern coil and a focusing coil arranged at the other side of the first fine pattern coil, a second fine pattern coil having tracking coils and a focusing coil that are arranged symmetrically with the tracking coils and the focusing coil of the first fine pattern coil, respectively, and magnets embedded in the guide groove opposite to each other at both sides of the first and second fine pattern coils;

elastic supporting members having one end coupled to the holder and the other end coupled to the first and second fine pattern coils; and holes serving as paths through which current is supplied to the first and second fine pattern coils formed in the first and second fine pattern coils, wherein the elastic supporting members are alternately soldered in verticle relation along each side of the first and second fine pattern coils through the holes.

25. An optical recording and/or reproducing apparatus including a spindle motor which rotates a disc, an optical pickup which is installed to be movable in the direction of a radius of the disc and includes an actuator which reproduces or records information recorded on the disc, a driving portion which drives the spindle motor and the optical pickup, and a controlling portion which controls focusing, tracking, and tilting servos of the optical pickup, wherein the optical pickup actuator comprises:

a base having a holder positioned at one side of the base;

a blade having an objective lens mounted at one side of the blade, and a guide groove;

a magnetic driving portion including at least one fine pattern coil installed across the guide groove and magnets arranged to be embedded in the guide groove opposite to each other at both sides of the fine pattern coil; and elastic supporting members having one end coupled to the holder such that the blade is movably supported;

wherein the fine pattern coil comprises at least one focusing coil and at least one tracking coil, and wherein the fine pattern coil is centered on a center line, and the at least one focusing coil is arranged opposite the at least one tracking coil about the center line, the at least one focusing coil being situated entirely on one side of the center line and the at least one tracking coil being situated entirely on the other side of the center line.

26. The apparatus of claim 25, wherein said at least one fine pattern coil comprises first and second fine pattern coils which are overlapped.

27. The apparatus of claim 26, further comprising a plurality of the focusing coils respectively arranged at each of the first and second fine pattern coils are arranged symmetrically.

28. The apparatus of claim 27, wherein current is respectively supplied to the focusing coil of the first fine pattern coil and the focusing coil of the second fine pattern coil such that a tilting operation is performed.

29. The apparatus of claim 28, wherein the tracking coils arranged at each of the first and second fine pattern coils are arranged symmetrically.

30. The apparatus of claim 29, wherein the magnets are polarization magnets.

31. The apparatus of claim 30, wherein the elastic supporting members are coupled to both ends of the first and second fine pattern coils.

32. The apparatus of claim 21, further comprising six elastic supporting members to perform focusing, tracking and tilting operations.

33. The apparatus of claim 27, wherein the tracking coils arranged in each of the first and second fine pattern coils are arranged symmetrically.

34. The apparatus of claim 33, wherein the magnets are polarization magnets.

35. The apparatus of claim 34, wherein the elastic supporting members are coupled to both ends of the first and second fine pattern coils.

36. The apparatus of claim 35, wherein the elastic supporting members are alternately soldered at each side of the first and second fine pattern coils.

37. The apparatus of claim 26, wherein the tracking coils arranged in each of the first and second fine pattern coils are arranged symmetrically.

38. An optical recording and/or reproducing apparatus including a spindle motor which rotates a disc, an optical pickup which is installed to be movable in the direction of a radius of the disc and includes an actuator which reproduces or records information recorded on the disc, a driving portion which drives the spindle motor and the optical pickup, and a controlling portion which controls focusing, tracking, and tilting servos of the optical pickup, wherein the optical pickup actuator comprises:

a base having a holder positioned at one side of the base;

a blade having an objective lens mounted at one side of the blade, and a guide groove;

a magnetic driving portion including at least one fine pattern coil installed across the guide groove and magnets arranged to be embedded in the guide groove opposite to each other at both sides of the fine pattern coil; and elastic supporting members having one end coupled to the holder such that the blade is movably supported, wherein said at least one fine Pattern coil comprises first and second fine pattern coils which are overlapped, and wherein the elastic supporting members are alternately soldered in verticle relation along each side of the first and second fine pattern coils.

39. An optical pickup actuator comprising:

a base having two magnets facing each other at a predetermined distance and a holder; and a blade having an objective lens at one end, a guide groove adjacent to the objective lens and coils positioned at a center of the guide groove to divide the guide groove into two portions;

wherein the blade is positioned on the base such that each magnet is positioned within one of the two portions of the guide groove to drive the actuator in focusing, tracking and tilting directions when current is applied to the coils, wherein each of the coils comprises at least one focusing coil and at least one tracking coil, and wherein the coils are fine pattern coils, each fine pattern coil being centered on a center line and the at least one focusing coil being arranged opposite the at least one tracking coil about the center line, the at least one focusing coil being situated entirely on one side of the center line and the at least one tracking coil being situated entirely on the other side of the center line.

* * * * *

UNITED STATES PATENT AND TRADEMARK OFFICE
CERTIFICATE OF CORRECTION

| | |
|---|---|
| PATENT NO. | : 7,203,136 B2 |
| APPLICATION NO. | : 10/350088 |
| DATED | : April 10, 2007 |
| INVENTOR(S) | : Duk-young Chong et al. |

Page 1 of 1

It is certified that error appears in the above-identified patent and that said Letters Patent is hereby corrected as shown below:

Column 10, Line 10, change "verticle" to --vertical--.

Column 10, Line 60, change "claim 21," to --claim 31,--.

Column 12, Line 1, change "Pattern" to --pattern--.

Column 12, Line 4, change "verticle" to --vertical--.

Signed and Sealed this

Twenty-fourth Day of July, 2007

JON W. DUDAS
*Director of the United States Patent and Trademark Office*